United States Patent
Galbis

(10) Patent No.: US 8,161,869 B2
(45) Date of Patent: *Apr. 24, 2012

(54) DEVICE AND METHOD FOR CLEANING A FRENCH OR COFFEE PRESS

(76) Inventor: Pio Galbis, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/288,740

(22) Filed: Nov. 3, 2011

(65) Prior Publication Data

US 2012/0042904 A1 Feb. 23, 2012

Related U.S. Application Data

(62) Division of application No. 12/145,160, filed on Jun. 24, 2008, now Pat. No. 8,074,561.

(51) Int. Cl.
*A47J 31/20* (2006.01)
(52) U.S. Cl. .......................................................... 99/297
(58) Field of Classification Search ............... 99/297; 175/323, 102, 310, 388
See application file for complete search history.

(56) References Cited

U.S. PATENT DOCUMENTS

| | | |
|---|---|---|
| 111,300 A | 1/1871 | Altman |
| 161,640 A | 4/1875 | Smith |
| 297,642 A | 4/1884 | Sickler |
| 1,569,787 A | 1/1926 | Robertson |
| 2,352,326 A | 6/1944 | Kandle |
| 2,729,067 A | 1/1956 | Patterson |
| 2,810,553 A | 10/1957 | Bigelow et al. |
| 2,912,225 A | 11/1959 | Kandle |
| 3,339,476 A | 9/1967 | De Troya |
| 5,478,586 A * | 12/1995 | Connor ........................ 426/431 |
| 6,295,920 B1 * | 10/2001 | Barden et al. .................. 99/297 |
| 6,296,068 B1 | 10/2001 | Frederick |
| 6,422,133 B1 * | 7/2002 | Brady ............................ 99/297 |
| 7,032,505 B2 * | 4/2006 | Brady ............................ 99/297 |
| 7,040,218 B1 * | 5/2006 | Biolchini, Jr. ................. 99/297 |
| 7,194,951 B1 * | 3/2007 | Porter .......................... 100/116 |
| 7,213,507 B2 * | 5/2007 | Glucksman et al. ........... 99/297 |
| 8,074,561 B2 | 12/2011 | Galbis |
| 2004/0000431 A1 | 1/2004 | Van Denham |
| 2007/0028779 A1 * | 2/2007 | Pigliacampo et al. .......... 99/297 |

* cited by examiner

*Primary Examiner* — Duc Nguyen
*Assistant Examiner* — Mark Woodall
(74) *Attorney, Agent, or Firm* — Morgan Lewis & Bockius LLP

(57) ABSTRACT

A press cleaning device and method are described for removing coffee grinds from a French or coffee press. The device includes a stem having a handle and a circular disk-shaped declining plane ramp disposed at different ends. The circumference of the ramp is substantially the same as the inner circumference of the press. The ramp includes a radial cut running diametrically from the center of the ramp toward the outer circumference. The cut is fabricated to provide a lower or leading edge paralleling the horizontal floor of the press and trailing the leading edge an upward slanted ramp that follows like a circular inclined plane to an upper or ending edge. When rotated, the lower edge, which parallels the floor of the coffee press while slicing and shoveling, transfers the grinds from the bottom of the press up the ramp whereupon the grinds are stacked and can be removed.

2 Claims, 4 Drawing Sheets

DEVICE AND METHOD FOR CLEANING A FRENCH OR COFFEE PRESS

CROSS-REFERENCE TO RELATED APPLICATION

This application is a division of U.S. patent application Ser. No. 12/145,160 filed Jun. 24, 2008, all of which is herein incorporated by reference in its entirety.

FIELD OF INVENTION

The present invention relates generally to cleaning a coffee press. More particularly, the present invention relates to a device and method for removing coffee grinds from a coffee press.

BACKGROUND OF THE INVENTION

As a coffee-brewing device popularized in France, a French press is often credited for producing a stronger, creamier coffee than produced by other brewing devices or techniques. Mostly considered as the premier method for brewing a high quality coffee beverage, usage of the French press generally contributes to a coffee having great flavor and consistency due, at least in part, to being able to control the extraction time and delivery of oils that are frequently trapped in the filters used by other brewing devices.

The French press may also be referred to as a press pot, coffee press, coffee plunger, or cafetière. Although some may discern a technical distinction amongst the aforementioned devices, as used in herein, the expressions "French press," "press pot," "coffee press," "coffee plunger," and "cafetière" shall be deemed to have the same meaning and will be used interchangeably. Typically, the French press includes a glass, plastic, or similarly rigid jug having a cylindrical shape. The French press is equipped with a lid and a plunger that fits tightly inside the jug. The plunger includes a fine wire or nylon mesh that serves as a filter. To brew coffee, coffee having a coarse grind is placed inside of the jug, and hot water is poured over the grinds. The coffee is allowed to steep for a few minutes, and then a plunger is depressed into the bottom to separate the grinds from the liquid. Afterwards, the coffee can be poured from a spout in the jug into a cup or other container for drinking while the grinds remain trapped underneath the filter at the bottom of the jug.

After partaking of the coffee, thoroughly removing and disposing of the coffee grinds from the bottom of the coffee press is difficult and time-consuming. A common technique for removing grinds is to fill the French press with water to make the grinds more liquid and less paste-like. The water is swirled inside the French press, and the contents are dumped into a sink. Discarding them into the sink generally creates a cumbersome mess; however the larger drawback to this technique is that the accumulation of grinds in the pipes often clogs the plumbing.

A common technique for cleaning the grinds from a French press involves using a large spoon and painstakingly scooping and scraping the grinds out of the French press. Yet, another technique is to knock the French press against a soft-edged garbage pail and hope the grinds will simply fall into the pail, this results most often in only partially removing the grinds with the remainder adhering to the sides of the cafetière. This latter technique is also problematic because, along with the grinds some liquid always remains at the bottom of the coffee press and when disposed inside a pail, the water content can leak though a porous trash bag or pail; additionally, this technique does not completely remove the grinds, since much of the grinds remain adhering to the sides or bottom of the French press. The various methods engaged in removing grinds, such as the spooning and dumping techniques waste generous amounts of time and effort, and rarely completely remove the grinds.

Accordingly, it is desirable to provide a device and method that can take the coffee grinds out of the bottom of a French press easily, neatly, quickly, efficiently, thoroughly, and effectively without damaging the plumbing or resulting in more of a mess.

BRIEF SUMMARY OF THE INVENTION

As described herein, the present invention relates to a device and method for removing coffee grinds and other particles from the bottom of a French press with a minimal amount of effort. A press cleaning device is configured to be positioned inside any size French press. The press cleaning device includes a stem (providing a central axis for rotating the device) having a handle disposed at a first end (the top) and a circular-shaped ramp or declining plane whose floor is flat disposed at a second end (the bottom); both ends are attached at their centers and perpendicularly to the stem.

The stem is a relatively thin tube having a height that is greater than the height of the French press. The stem can be fabricated to fit one of a plurality of configurations, including, but not limited to, circular, square, poly-sided, or the like.

The handle is coupled to the top of the stem and enables a user to rotate or twist the stem. The circular disk-shaped ramp is coupled at its center to the stem, and forms a curving, gradually descending plane beneath the stem. The circumference of the ramp is substantially the same as the circumference of the inside of the French press. In an embodiment, the circumference of the lowermost portion of the ramp is slightly smaller than the circumference of the upper portion of the ramp.

The ramp includes a cut from the outside edge of the ramp along the diameter of the ramp toward the middle where the ramp is coupled to the stem; the cut is similar to the radius of a circle. The cut provides a leading edge and an ending edge. The leading edge is fabricated to be lower than the ending edge and parallel to the bottom or floor of the French press so that from the lower, leading edge, a circular ramp wraps around in an incline to the upper, ending edge.

In an embodiment, the leading edge is slightly less in length than the remainder of the ramp and of the ending edge (whereas, the ending edge produces a circumference that is substantially the same as the inner circumference of the French press), this adjustment provides for the fact that coffee presses are molded so that the region where the vertical sides meets the bottom of the coffee press is an inward curve, resulting in the bottom being of lesser circumference than the remainder of the coffee press; this shorter and lower leading edge allows the device to reach the bottom.

Using the handle, the stem is rotated to cause the sharp leading edge to screw around and downward toward the bottom of the French press thereby slicing through the coffee grinds and other particles (e.g., tea is sometimes brewed in French presses) settled at the bottom of the French press. As the leading edge penetrates the grinds, the grinds are transferred up the ramp and efficiently compacted and stacked upon the ramp. During the stacking process, the sides of the French press function as walls and the ramp functions as a floor for the grinds as they are neatly stacked. The grinds readily adhere to each other and form the shape of the inside surface of the French press. Upon the leading edge's reaching the bottom—an indication that all of the grinds have been "shoveled" up, a palpable difference is felt in the exertion used (the overall exertion is minimal), whereupon the user lifts the handle of the device upward to remove the stacked grinds from the French press and the majority of the liquid drains to the bottom of the French press, leaving just enough moisture for the grinds to "glue" together. Since the circular ramp is substantially the same circumference as the cafetière, the ramp scrapes clean any grind along the sides of the French press during this upward motion, resulting in a clean French press.

The above described and many other features of the present invention will become apparent, as the present invention becomes better understood by reference to the following detailed description when considered in conjunction with the accompanying drawings.

BRIEF DESCRIPTION OF THE DRAWINGS

The accompanying drawings, which are incorporated herein and form part of the specification, illustrate the present invention and, together with the description, further serve to explain the principles of the present invention and to enable a person skilled in the pertinent art to make and use the present invention. In the drawings, like reference numbers indicate identical or functionally similar elements. Additionally, the leftmost digit(s) of a reference number identifies the drawing in which the reference number first appears.

DETAILED DESCRIPTION OF PREFERRED EMBODIMENTS

In the following description of embodiments of the present invention, reference is made to the accompanying drawings that form a part hereof and in which is shown by way of illustration a number of specific embodiments in which the present invention can be practiced. It is to be understood that other embodiments can be utilized and structural changes can be made without departing from the scope of the present invention.

This specification discloses one or more embodiments that incorporate features of the present invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the relevant art(s) to effect such feature, structure, or characteristic in connection with other embodiments whether or not explicitly described.

Figure 1:
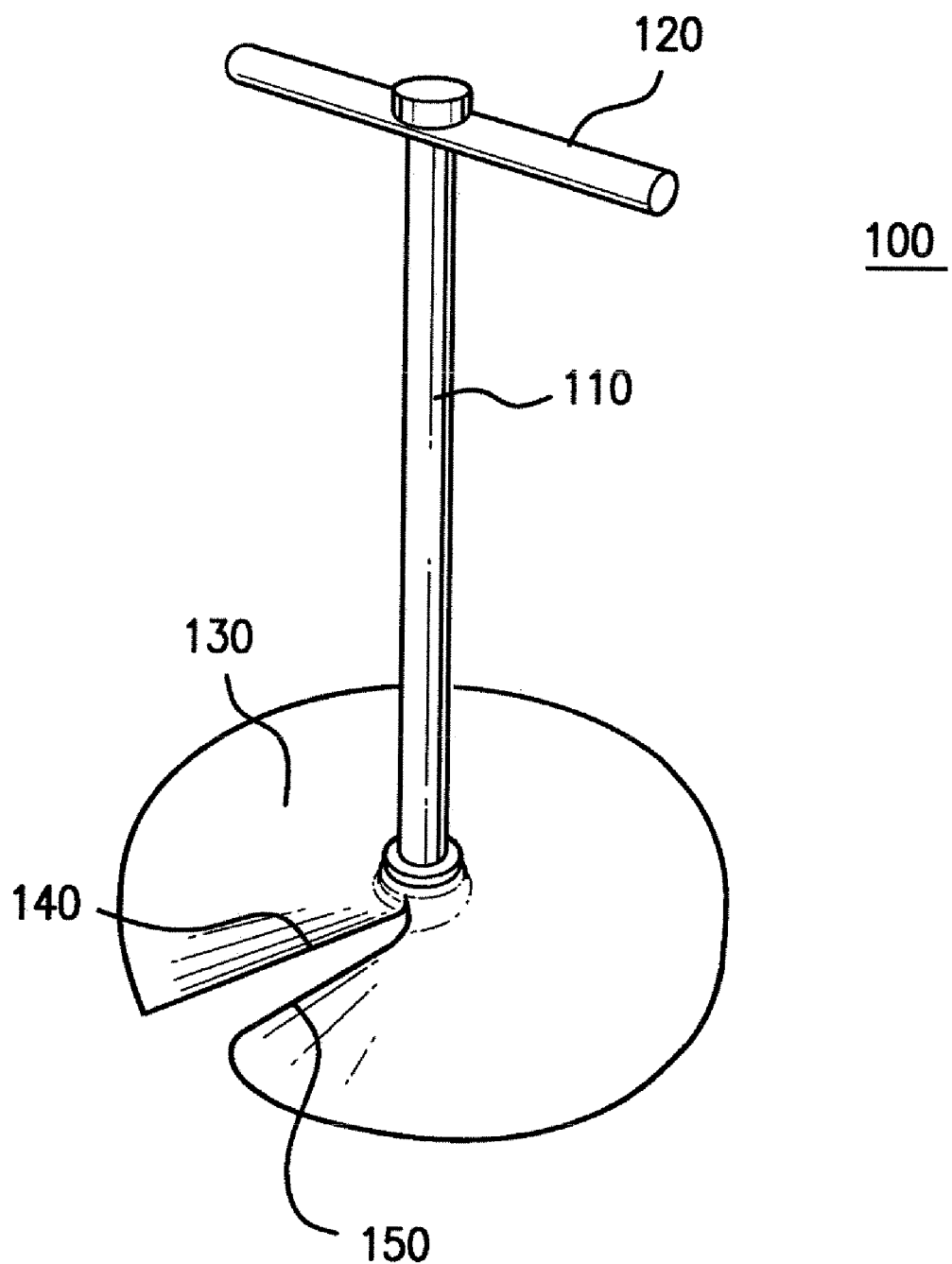
FIG. 1 illustrates an embodiment of a press cleaning device.
Figure 2:
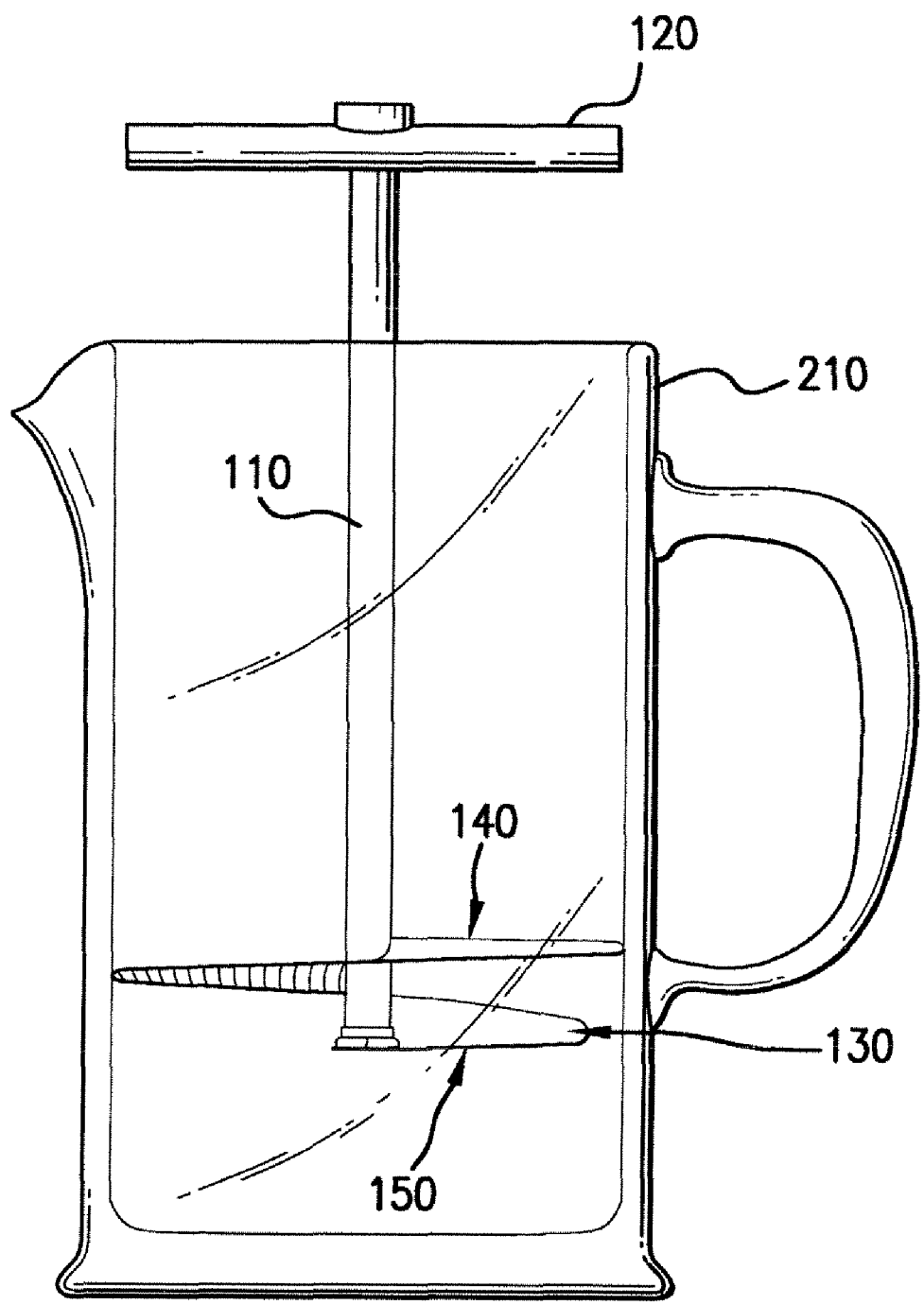
FIG. 2 illustrates an embodiment of a press cleaning device positioned within a French press.

A device and method are described herein for removing coffee grinds and other particles from the bottom of a French press thoroughly and with a minimal amount of effort. FIG. 1 and FIG. 2 illustrate an embodiment of a press cleaning device 100 that can be operatively positioned inside of a French press, such as French press 210, to remove coffee grinds and other particles from the inside bottom of the French press. The press cleaning device 100 includes a cylindrical stem 110 having a handle 120 disposed at a first end and a flat circular disk-shaped ramp 130 disposed at a second end.

The stem 110 provides a central axis for manipulating the device 100, as described herein. The stem 110 is a relatively thin tube having a vertical height that is slightly and comfortably greater than the height of the French press 210. Although the stem 110 is illustrated in FIG. 1 as having a tubular shape, various other configurations can be utilized. For example, a cross-sectional view of the various configurations for the stem 110 can be circular, oval, triangular, square, poly-sided, star-shaped, or the like.

The handle 120 is coupled to the stem 110 to enable a user to rotate or twist the stem 110. In FIG. 1, the handle 120 is illustrated as being perpendicular to the top of stem 110, but the handle 120 can be positioned at other angles or possess other configurations, for example a spherical shape, as long the handle 120 permits the user to easily grip and rotate the stem 110 on a central axis. In an embodiment, the handle 120 is coupled in the middle to the top of the stem 110 and enables the user to rotate the stem 110 in a clockwise motion. In other embodiments, the handle 120 is coupled to enable the user to rotate the stem 110 in a counter-clockwise motion. In another embodiment, a knob is included and adapted to be pushed at the handle end of the stem and results in the ramp 130 below rotating.

The center of the disk-shaped ramp 130 is perpendicularly coupled on its central axis to the stem 110, and forms a gradually descending curving plane or ramp beneath the stem 110. The ramp 130 is also positioned onto the stem 110 such that the leading lower edge 150 of the ramp 130 is parallel to the handle 120 (which parallels the floor of the French press 210). The circumference of the ramp 130 is substantially the same as the circumference of the inside of the French press 210. In another embodiment the outside edges of the ramp 130 can be made of a malleable or pliable material, such as soft rubber or plastic, which allows for a minimally wider diameter (than the inside diameter of the French press 210) thus affecting a thorough scraping of the walls of the French press 210. In the illustrated depictions, the ramp 130 is a rigid, solid floored or non-porous device; however in other embodiments, the ramp 130 could be a rigid porous screen-like material that allows the liquid to strain through but not the larger, coarse coffee grinds. Since French presses may vary in size or volume, the circumference of ramp 130 can also vary to match the inner circumference of the French press 210 that the device 100 is being used to clean. Therefore in an embodiment, the ramp 130 could be detachable from stem 110 so that differently sized ramps 130 can be attached and removed from device 100 and therefore used with differently sized French presses. In another embodiment, the device 100 is a single unit, with no detachable parts therefore requiring different devices at different circumferences for different sized presses.

The ramp 130 is formed or threaded around the stem 110 in a corkscrew manner. As such, the ramp 130 essentially begins as a circle that has been cut from the outside circumference of the ramp 130 along half the diameter of the ramp 130 toward the center where the ramp 130 is coupled on its central axis to the stem 110, this cut is equal to the radius of the inner circumference of the French press 210 and produces two edges. One edge of this cut is then engineered or manipulated from the inside (stem side) or center of the circle and along its entire length to become lower than the other cut (the upper or ending edge 140) and becomes the leading edge 150—whose entire edge parallels the floor of the French press 210 and the handle 120. As aforementioned, this cut also produces another edge known as the upper or ending edge 140. The leading edge 150 is also slightly less in length or radius than the final edge 140 to accommodate for the lesser circumference on the bottom of the French press 210 due to the curve where the side meets the bottom or floor of the cafetière, discussed in greater detail below with reference to FIG. 3 and FIG. 4.

The leading edge 150 is lower than the ending edge 140 and behind it the plane of the ramp 130 revolves gradually upward so that the circular disc-shape of the ramp 130 follows like an inclined ramp to the ending edge 140. In an embodiment, the ending edge 140 is positioned directly above the leading edge 150 with a small height difference between the two (as described in greater detail below with reference to FIG. 3 and FIG. 4). In another embodiment, the ramp 130 continues to thread around the stem 110 beyond the point where the leading edge 150 and the ending edge 140 are vertically aligned. For example, the ramp 130 can continue a full circle and a quarter or a full circle and a half. In either case, grinds or other particles that are pushed over ending edge 140 fall and remain on the ramp 130 positioned below.

When the device 100 is rotated clockwise, the leading edge 150 screws around and downward toward the bottom or floor of the French press 210. Accordingly, the leading edge 150 is configured to penetrate or slice through any coffee grinds and other particles settled at the bottom of the French press 210. As the leading edge 150 continues to penetrate, the grinds are transferred up the ramp 130 and neatly compacted and stacked on the ramp 130. During the stacking process, the sides of the French press 210 function as retaining walls and the ramp 130 functions as a supporting floor for the grinds as they are stacked. The grinds readily adhere to each other and form the shape of the inside surface of the French press 210. The user can continue to turn the handle 120 of the device 100 until there is no resistance. It should be understood that a difference in pressure would be readily apparent when the ramp 130 scrapes or "shovels" the last of the grinds from the bottom of the inside of the French press 210. Upon reaching the bottom, the user can lift the handle 120 vertically or upward, and as the device 100 is pulled upward and out of the French press 210, any remaining liquid flows down and out of the grinds and remains in the French press 210. As discussed, the minimal moisture remaining within the grinds causes them to cement together forming a solid or rigid form. This adhesive property enables the molded grains to remain perfectly formed and stacked onto the ramp 130 as the device 100 is lifted out of the French press 210 and readily remain formed and stacked on the device outside the cafetière when transferring them to a rubbish container. In addition, as discussed, the ramp 130 being substantially the same circumference as the French press 210, scrapes clean the walls of the French press 210 leaving no grind residue along the sides of the cafetière.

The circular motion caused by rotating the handle 120, and concomitantly the ramp 130, contributes to the grinds piling compacted and formed onto the ramp 130 and quickly produces a neat and rigid, stack. Thus, the device 100 overcomes the drawbacks of conventional techniques for removing coffee grinds that are time consuming and results in significant residue and dregs. The device 100 with the grinds stacked and compacted can be tapped on the side of a garbage pail, and all the grinds readily slide off the ramp 130 and fall inside the pail with only a trace of moisture. An advantage of this device 100 is that it cleans all the grinds from a French press 210 easily and quickly with a minimal amount of effort, and permits the French press 210, itself, to be easily rinsed clean of the remaining coffee liquid without harm to the plumbing.

To remove all of the grinds from the inside of the French press 210, it is important for the leading edge 150 to reach and scrape the bottom of the French press 210. Therefore, the height difference between the leading edge 150 and the ending edge 140 should be set to enable the leading edge 150 which parallels the bottom surface or floor of the French press 210 to reach the bottom of the French press 210; coffee presses generally have a slightly rounded bottom edge where the inner wall of the French press meets the bottom as they are commonly molded glass (as shown in FIG. 2; which represents a difference in circumferences: the lesser circumference of the bottom or floor and the greater circumference of the majority upper and parallel sides of the French press container). The difference in height between the leading edge 150 and the ending edge 140 should, at a minimum, be equivalent to the height of the curving on the rounded bottom edge within the French press 210 commonly three-eighths to three-fourths of an inch, depending on the size of the French press 210. In another embodiment, the height can be greater, has long as it is more than the difference between these two circumferences. This can be further explained with reference to FIGS. 3 and 4.

Figure 3:
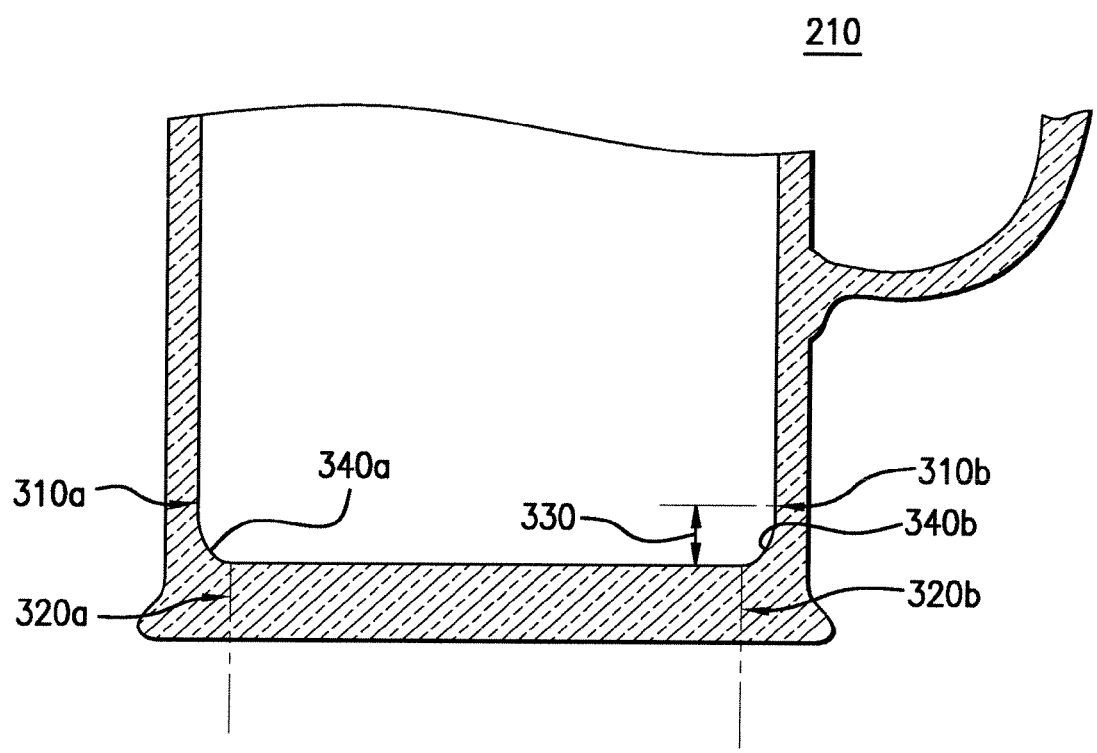
FIG. 3 illustrates an embodiment of an expanded view of the lower portion and inside curvature of the French press of FIG. 2.

FIG. 3 illustrates an expanded view of the lower portion of the French press 210 to emphasize the curvature 340a-340b of the inside bottom surface. The vertical sides of the French press 210 are molded so that the region where the vertical sides meet the horizontal bottom or floor of the French press 210 is an inward curve (i.e., curvature 340a-340b). Upper indicators 310a-310b specify an area immediately above the curvature 340a-340b, lower indicators 320a-320b specify area where the curvature 340a-340b meets the bottom of the French press 210, and the vertical height 330 of the curvature 340a-340b is measured from the bottom to the upper indicators 310a-310b. The horizontal distance between upper indicators 310a-310b defines a first diameter at a point immediately above the curvature 340a-340b. The horizontal distance between lower indicators 320a-320b defines a second diameter of the bottom of French press 210, which coincidentally is the area immediately below the curvature 340a-340b. Since the second diameter is smaller than the first diameter, the circumference for the bottom of the French press 210 is less than the circumference for the remainder of the coffee press.

Thus, the curvature 340a-340b of the inner bottom of the French press 210 also causes the bottom circumference (measured from lower indicators 320a-320b) to be slightly smaller than the inner circumference (measured from upper indicators 310a-310b) of the French press 210 immediately above the curvature 340a-340b. As such in an embodiment, the length of leading edge 150 has a bit cut off; therefore, its radius is less than the radius of the ending edge 140 and equivalent or less than the circumference of the bottom-most part of the French press 210, which as mentioned above is a lesser circumference than the remainder of the French press 210 due to the molded inward slanted curve (curvature 340a-340) where the sides meet the floor. The outside corner of the length of leading edge 150 has the most cut-off. The amount cut-off reduces gradually as it continues up the ascending slant of the ramp 130 until it equals the larger circumference that is above the rounded bottom of the inside of the French press 210; which is the same circumference as the majority of the inside of the French press 210, or all of the area above the rounded bottom where the sides parallel one another—above this curve, the circumference of the coffee press remains equal. Without this cut to the length of the leading edge 150 and the aduated cut along the lowermost outside edge of the ramp, or the circumference of the ramp 130, the lower portion of the ramp 130 would be too wide to reach and scrape the bottom plane or floor of the French press 210 where the bottommost coffee grinds reside.

Figure 4:
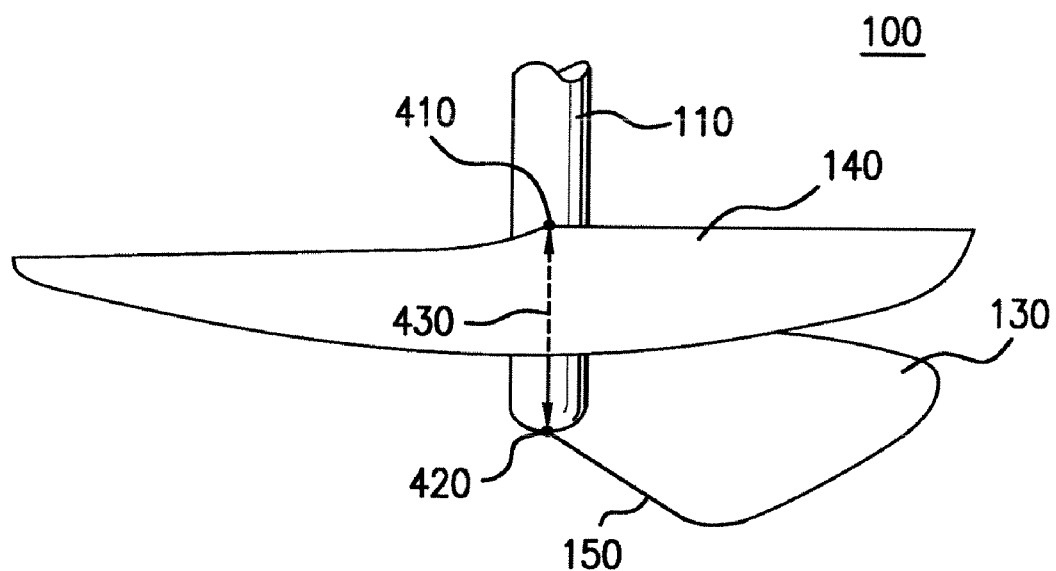
FIG. 4 illustrates an embodiment of an expanded view of the lower portion of the press cleaning device of FIG. 1.

The aforementioned graduated cut to the length of the leading edge 150 and the longer ending edge 140 can be explained with reference to FIG. 4, which illustrates an expanded view of the lower portion of device 100. The leading edge 150 is coupled along the central axis of the ramp 130 to stem 110 at lower position 420. Similarly, the ending edge 140 is coupled along the central axis of the ramp 130 to stem 110 at upper position 410. The vertical distance 430 between lower position 420 and higher position 410 is substantially the same or somewhat greater as the vertical height 330 of the curvature 340a-340b of the bottom inner surface of the French press 210. Hence, as discussed above, the graduated radial cut between the length of the shorter leading edge 150 and the length of the longer ending edge 140 allows the lower leading edge 150 to reach and scrape the bottom of the French press 210.

For French presses that do not have cylindrical glass volumes with rounded edges, the graduated cutting and rounding of the corner of the leading edge 150 would not be necessary. Otherwise, the graduated cutting and rounding allows the leading edge 150 to scrape along the entire surface of the bottom thereby leaving no grinds or other particles inside of the French press 210.

In an embodiment, the shape of the ramp 130 is flat and circular as discussed. However in other embodiments, the outside edges of the ramp 130 can be convex, concave, or a mixture of both in shape as long as the ramp 130 is capable of removing substantially all of the grinds from the bottom of the French press 210. In an embodiment, the outside edges of the ramp 130 can have a railing (e.g., walls perpendicular to the floor of the ramp 130) akin to the walls of the French press 210, as side support for the coffee grinds. In another embodiment, the outside edges of ramp 130 may be made of a malleable or pliable material, such as soft rubber or plastic which allows for a minimally wider diameter (than the inside diameter of the French press 210) thus affecting a thorough scraping of the walls of the French press 210.

The stem 110, the handle 120, and ramp 130 can be made of a plastic, metal, alloy, ceramic, or other sturdy materials. If the selected material is a metal or an alloy, a metal, such as copper or aluminum, should be selected to minimize oxidation or rusting of the components. They can also be painted with rust-proof paint and easily labeled for advertising. All three components can be made of the same materials, or different materials can be used to fabricate the components. The handle 120, the ramp 130, or both can be integrally formed into the stem 110 or removably attached to the stem 110, particularly as aforementioned in the case of the stem 110 and the ramp 130 in order for the ramp 130 to be interchangeable to the various sizes of French presses 210, according to the manufacturers' wishes. If the manufacturer chooses a screw-like device, then the clockwise motion of the handle would perfectly fit and corroborate the counter-clockwise screw attachment of the ramp 130.

It should be understood that the device 100, as described herein, is an exemplary device for implementing various aspects of the present invention. Notably, the figures and examples above are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the present invention. In the present specification, an embodiment showing a singular component should not necessarily be limited to other embodiments including a plurality of the same component, and vice-versa, unless explicitly stated otherwise herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). Moreover, it is not intended for any term in the specification or claims to be ascribed an uncommon or special meaning unless explicitly set forth as such. Further, the present invention encompasses present and future known equivalents to the known omponents referred to herein by way of illustration. While various embodiments of the present invention have been described above, it should be understood that they have been presented by way of example, and not limitation. It would be apparent to one skilled in the relevant art(s) that various changes in form and detail could be made therein without departing from the spirit and scope of the present invention. Thus, the present invention should not be limited by any of the above-described exemplary embodiments, but should be defined only in accordance with the following claims and their equivalents.

What is claimed is:

1. A method for removing coffee grinds deposited within a coffee press, the method comprising:
   inserting, into the coffee press, a press cleaning tool comprising:
   a cylindrical stem having a first end and a second end;
   a handle coupled to the first end of the stem, wherein the handle is configured to enable a rotation of the stem when the stem is vertically disposed within the coffee press; and
   a circular disk-shaped declining-plane ramp coupled to the second end of the stem and threaded about a central axis of the stem, wherein the ramp includes an upper edge and a lower edge produced by a radial cut running diametrically from an outer circumference of the ramp to a center position;
   rotating the press cleaning tool along the central axis to enable the lower edge to penetrate downwardly into the coffee grinds to thereby cause the coffee grinds to traverse the ramp in an upward motion and cause the coffee grinds to stack upon the ramp, whereby an inner surface of the coffee press functions as a wall for molding the stacked grinds and the ramp functions as a supporting floor for the stacked grinds; and
   lifting the press cleaning tool vertically to remove the stacked grinds from the coffee press.

2. The method of claim 1, further comprising rotating the press cleaning tool until the lower edge of the ramp parallels and scrapes the bottom of the inner surface of the coffee press to substantially remove and push along to an upper portion of the ramp all of the coffee grinds from the bottom.

* * * * *